US012706632B2

(12) United States Patent
Han et al.

(10) Patent No.: US 12,706,632 B2
(45) Date of Patent: Aug. 11, 2026

(54) ELECTRONIC DEVICE FOR OBTAINING REFLECTION COEFFICIENT OF ANTENNA AND OPERATING METHOD THEREOF

(71) Applicant: SAMSUNG ELECTRONICS CO., LTD., Suwon-si (KR)

(72) Inventors: Janghoon Han, Suwon-si (KR); Daehee Park, Suwon-si (KR); Gunjong Bong, Suwon-si (KR); Yongbeen Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 18/933,668

(22) Filed: Oct. 31, 2024

(65) Prior Publication Data

US 2025/0080159 A1 Mar. 6, 2025

Related U.S. Application Data

(63) Continuation of application No. PCT/KR2024/008436, filed on Jun. 19, 2024.

(30) Foreign Application Priority Data

Aug. 28, 2023 (KR) ........................ 10-2023-0112984
Oct. 16, 2023 (KR) ........................ 10-2023-0138041

(51) Int. Cl.
*H04B 1/58* (2006.01)
*H04B 1/00* (2006.01)
*H04B 1/401* (2015.01)

(52) U.S. Cl.
CPC ............ *H04B 1/58* (2013.01); *H04B 1/0028* (2013.01); *H04B 1/401* (2013.01)

(58) Field of Classification Search
CPC .. H04B 1/0021; H04B 1/0028; H04B 1/0032; H04B 1/0039; H04B 1/006; H04B 1/38;
(Continued)

(56) References Cited

U.S. PATENT DOCUMENTS

2009/0253385 A1* 10/2009 Dent .................... H04B 1/0458 455/73
2018/0054196 A1 2/2018 Yang et al.
(Continued)

FOREIGN PATENT DOCUMENTS

KR 10-2018-0010883 A 1/2018
KR 10-2020-0063018 A 6/2020
(Continued)

OTHER PUBLICATIONS

International Search Report (PCT/ISA/210) issued by the International Searching Authority on Sep. 27, 2024 in corresponding International Application No. PCT/KR2024/008436.

*Primary Examiner* — Young T. Tse
(74) *Attorney, Agent, or Firm* — Sughrue Mion, PLLC

(57) ABSTRACT

An electronic device may include: a transceiver may include an analog-to-digital converter (ADC) and a digital-to-analog converter (DAC); a coupler connected to the transceiver through a feedback path; at least one memory storing instructions; and at least one communication processor configured to execute the instructions to: provide a digital transmission signal to the transceiver; receive a digital feedback signal from the transceiver; and obtain a reflection coefficient based on the digital transmission signal and the digital feedback signal. The DAC may be configured to convert the digital transmission signal into an analog signal, and the ADC may be configured to convert a signal into a digital signal to obtain the digital feedback signal, based on
(Continued)

sampling information controlled according to a resource block size of the digital transmission signal.

20 Claims, 12 Drawing Sheets

(58) Field of Classification Search
CPC .......... H04B 1/40; H04B 1/401; H04B 1/403; H04B 1/54; H04B 1/58
USPC ........................ 375/219, 221, 260, 296, 297; 370/276–278; 455/63.1, 63.3, 67.13, 69, 455/501
See application file for complete search history.

(56) References Cited

U.S. PATENT DOCUMENTS

| | | | | |
|---|---|---|---|---|
| 2020/0144973 | A1* | 5/2020 | Gunzner | H03F 1/52 |
| 2020/0146023 | A1 | 5/2020 | Kim et al. | |
| 2020/0169276 | A1* | 5/2020 | Kim | H03H 7/38 |
| 2021/0036722 | A1 | 2/2021 | Lim et al. | |
| 2025/0112665 | A1* | 4/2025 | Chen | H04B 17/14 |

FOREIGN PATENT DOCUMENTS

| | | | |
|---|---|---|---|
| KR | 10-2021-0153748 | A | 12/2021 |
| KR | 10-2022-0105531 | A | 7/2022 |
| WO | 2020/068339 | A1 | 4/2020 |

* cited by examiner

ELECTRONIC DEVICE FOR OBTAINING REFLECTION COEFFICIENT OF ANTENNA AND OPERATING METHOD THEREOF

CROSS-REFERENCE TO RELATED APPLICATIONS

This application is a continuation application of International Application No. PCT/KR2024/008436 designating the United States, filed on Jun. 19, 2024, in the Korean Intellectual Property Receiving Office and claiming priority to Korean Patent Application No. 10-2023-0112984, filed on Aug. 28, 2023, and Korean Patent Application No. 10-2023-0138041, filed on Oct. 16, 2023, in the Korean Intellectual Property Office, the disclosures of which are incorporated by reference herein in their entireties.

BACKGROUND

1. Field

The disclosure relates to an electronic device for obtaining the reflection coefficient of an antenna and an operating method thereof.

2. Description of Related Art

In a wireless communication network, an electronic device may measure the reflection coefficient for an antenna to determine whether the antenna is abnormal. The electronic device may improve the antenna performance by adjusting the impedance of the antenna according to the reflection coefficient. In addition, the electronic device may determine whether the electronic device is gripped by a user using the reflection coefficient. The above description is information the inventor(s) acquired during the course of conceiving the present disclosure, or already possessed at the time, and is not necessarily art publicly known before the present application was filed.

SUMMARY

According to an aspect of the disclosure, an electronic device may include: a transceiver may include an analog-to-digital converter (ADC) and a digital-to-analog converter (DAC); a coupler connected to the transceiver through a feedback path; at least one memory storing instructions; and at least one communication processor configured to execute the instructions to: provide a digital transmission signal to the transceiver; receive a digital feedback signal from the transceiver; and obtain a reflection coefficient based on the digital transmission signal and the digital feedback signal. The DAC may be configured to convert the digital transmission signal into an analog signal, and the ADC may be configured to convert a signal into a digital signal to obtain the digital feedback signal, based on sampling information controlled according to a resource block size of the digital transmission signal.

The digital transmission signal may include a first transmission signal and a second transmission signal, and the digital feedback signal may include a forward signal received by the at least one communication processor in response to provision of the first transmission signal, and a reverse signal received by the at least one communication processor in response to provision of the second transmission signal.

The sampling information may include at least one of a sampling rate and a sampling count.

The at least one communication processor may be further configured to execute the instructions to: control the sampling information based on a threshold value of the resource block size; control the sampling information as first sampling information based on the resource block size exceeding the threshold value; and control the sampling information as second sampling information based on the resource block size being less than or equal to the threshold value.

A sampling count of the second sampling information may be greater than a sampling count of the first sampling information.

A sampling rate of the second sampling information may be less than a sampling rate of the first sampling information.

The at least one communication processor may be further configured to execute the instructions to determine whether the electronic device is gripped using the reflection coefficient.

The at least one communication processor may be further configured to execute the instructions to display the reflection coefficient on a complex plane, and determine that the electronic device is gripped by a user based on the reflection coefficient being displayed outside a circle displayed on the complex plane, and the circle may have, as a center, a reflection coefficient determined based on the electronic device being not gripped.

The circle may have a center that differs depending on a frequency band, and has a radius that differs depending on the frequency band.

The radius may be determined to be smaller as the frequency band increases.

The reflection coefficient may be determined based on a ratio between a forward voltage and a reverse voltage, the forward voltage may be a correlation value between the first transmission signal and the forward signal, and the reverse voltage may be a correlation value between the second transmission signal and the reverse signal.

According to an aspect of the disclosure, an electronic device may include: a transceiver may include an analog-to-digital converter (ADC); a coupler connected to the transceiver through a feedback path; at least one memory storing instructions; and at least one communication processor configured to execute the instructions to: control a sampling rate and a sampling count to convert an analog signal into a digital signal based on whether a resource block size of a first transmission signal and a second transmission signal transmitted through the transceiver exceeds a threshold value; convert a forward signal and a reverse signal into digital signals through sampling with the controlled sampling rate and the controlled sampling count; obtain a forward voltage based on the first transmission signal and the converted forward signal; obtain a reverse voltage based the second transmission signal and the converted reverse signal; and identify a reflection coefficient of an antenna with respect to an input of a tuner connected to the coupler based on a ratio between the forward voltage and the reverse voltage. The forward signal may correspond to the first transmission signal received by the transceiver through the feedback path from the coupler, and the reverse signal may correspond to the second transmission signal received by the transceiver through the feedback path from the coupler.

According to an aspect of the disclosure, an operating method of an electronic device, may include: providing a digital transmission signal to a transceiver; receiving a digital feedback signal from the transceiver; and obtaining the reflection coefficient based on the digital transmission signal and the digital feedback signal. The digital transmission signal may be converted into an analog signal by a digital-to-analog converter (DAC) of the transceiver, and the digital feedback signal may be converted into a digital signal by an analog-to-digital converter (ADC) of the transceiver based on sampling information controlled according to a resource block size of the digital transmission signal.

The digital transmission signal may include a first transmission signal and a second transmission signal, and the digital feedback signal may include a forward signal received in response to provision of the first transmission signal, and a reverse signal received in response to provision of the second transmission signal.

The sampling information may include at least one of a sampling rate and a sampling count.

The sampling information may be controlled as first sampling information based on the resource block size exceeding a threshold value, and may be controlled as second sampling information based on the resource block size being less than or equal to the threshold value.

The operating method further may include determining whether the electronic device is gripped based on the reflection coefficient.

The determining of whether the electronic device is gripped based on the reflection coefficient may include displaying the reflection coefficient on a complex plane, and determining that the electronic device is gripped by a user based on the reflection coefficient being displayed outside a circle displayed on the complex plane, and the circle may have, as a center, a reflection coefficient determined based on the electronic device being not gripped.

The circle may have a different center depending on a frequency band, and has a different radius depending on the frequency band.

According to an aspect of the disclosure, a non-transitory computer-readable storage medium may store a program that is executed by at least one processor to perform the operating method.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
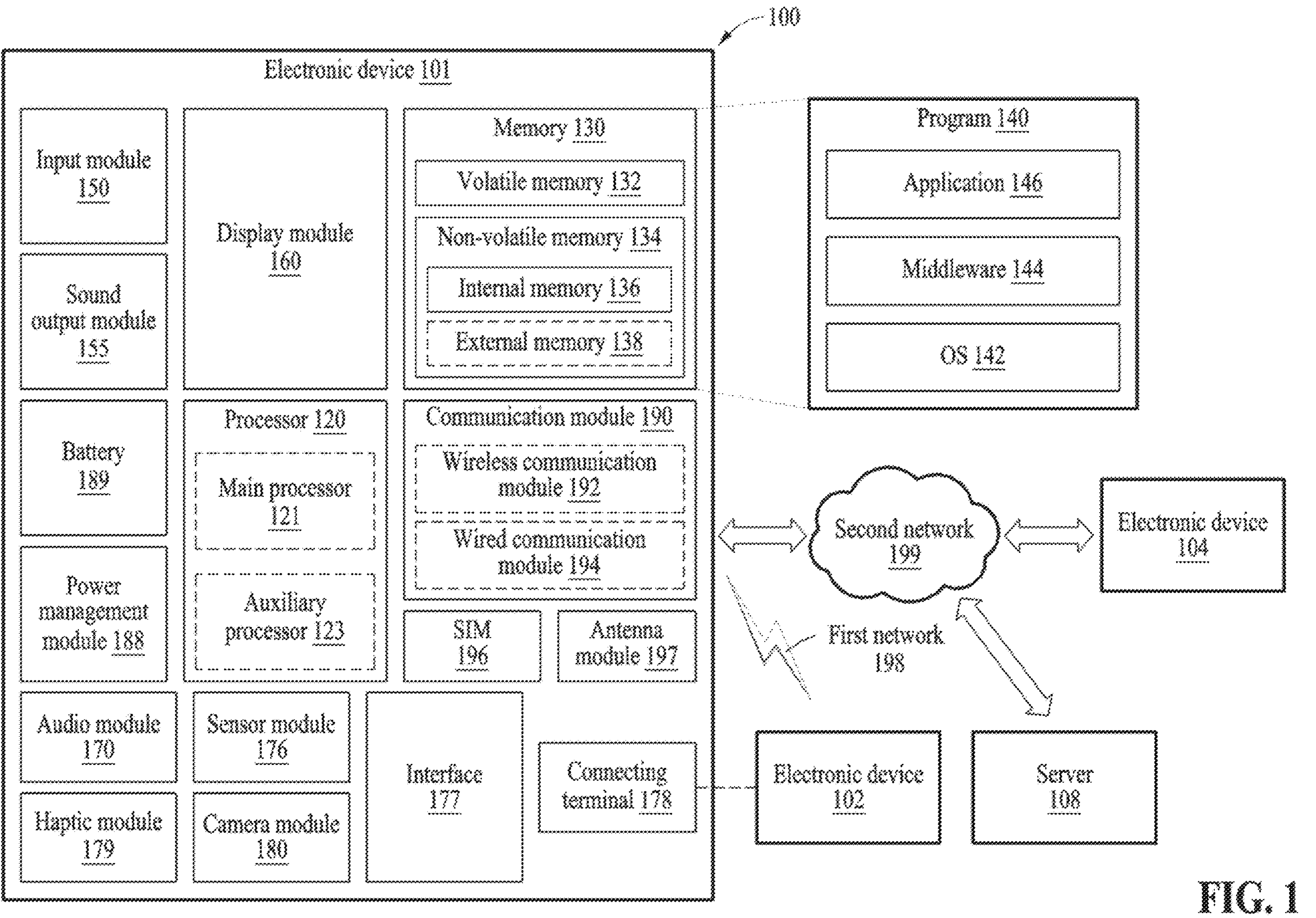
FIG. 1 is a block diagram of an electronic device in a network environment according to various embodiments.

Hereinafter, embodiments will be described in detail with reference to the accompanying drawings. When describing the embodiments with reference to the accompanying drawings, like reference numerals refer to like components, and any repeated description related thereto will be omitted.

FIG. 1 is a block diagram of an electronic device in a network environment according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to one or more embodiments, the electronic device 101 may communicate with the electronic device 104 via the server 108. According to one or more embodiments, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one or more embodiments, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one or more embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one or more embodiments, the auxiliary processor 123 (e.g., an ISP or a CP) may be implemented as a portion of another component (e.g., the camera module 180 or the communication module 190) that is functionally related to the auxiliary processor 123. According to one or more embodiments, the auxiliary processor 123 (e.g., an NPU) may include a hardware structure specified for processing of an artificial intelligence (AI) model. An artificial intelligence model may be generated by machine learning. Such learning may be performed, e.g., by the electronic device 101 where the artificial intelligence is performed, or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof, but is not limited thereto. The artificial intelligence model may, additionally or alternatively, include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing a record. The receiver may be used for receiving incoming calls. According to one or more embodiments, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to one or more embodiments, the display module 160 may include a touch sensor adapted to detect a touch, or a pressure sensor adapted to measure the intensity of force incurred by the touch.

The audio module 170 may convert a sound into an electrical signal and vice versa. According to one or more embodiments, the audio module 170 may obtain the sound via the input module 150, or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to one or more embodiments, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one or more embodiments, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image and moving images. According to one or more embodiments, the camera module 180 may include one or more lenses, image sensors, ISPs, or flashes.

The power management module 188 may manage power supplied to the electronic device 101. According to one or more embodiments, the power management module 188 may be implemented as, for example, at least a part of a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor) and support direct (e.g., wired) communication or wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to one or more embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one or more embodiments, the antenna module 197 may include an antenna including a radiating element including a conductive material or a conductive pattern formed in or on a substrate (e.g., a printed circuit board (PCB)). According to one or more embodiments, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may be transmitted or received between the communication module 190 and the external electronic device via the at least one selected antenna. According to one or more embodiments, another component (e.g., a radio frequency integrated circuit (RFIC)) other than the radiating element may be additionally formed as part of the antenna module 197.

According to various embodiments, the antenna module 197 may form a mmWave antenna module. According to one or more embodiments, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 101 and the external electronic device 104 via the server 108 coupled with the second network 199. Each of the external electronic devices 102 and 104 may be a device of a same type as, or a different type from, the electronic device 101. According to one or more embodiments, all or some of operations to be executed by the electronic device 101 may be executed at one or more external electronic devices (e.g., the external devices 102 and 104, and the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to one or more embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to one or more embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms such as "$1^{st}$," and "$2^{nd}$," or "first" and "second" may be used to simply distinguish a corresponding component from another, and do not limit the components in other aspect (e.g., importance or order). It is to be understood that if a component (e.g., a first component) is referred to, with or without the term "operatively" or "communicatively," as "coupled with," "coupled to," "connected with," or "connected to" another component (e.g., a second component), the component may be coupled with the other component directly (e.g., wiredly), wirelessly, or via a third component.

As used in connection with embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to one or more embodiments, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one or more embodiments, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
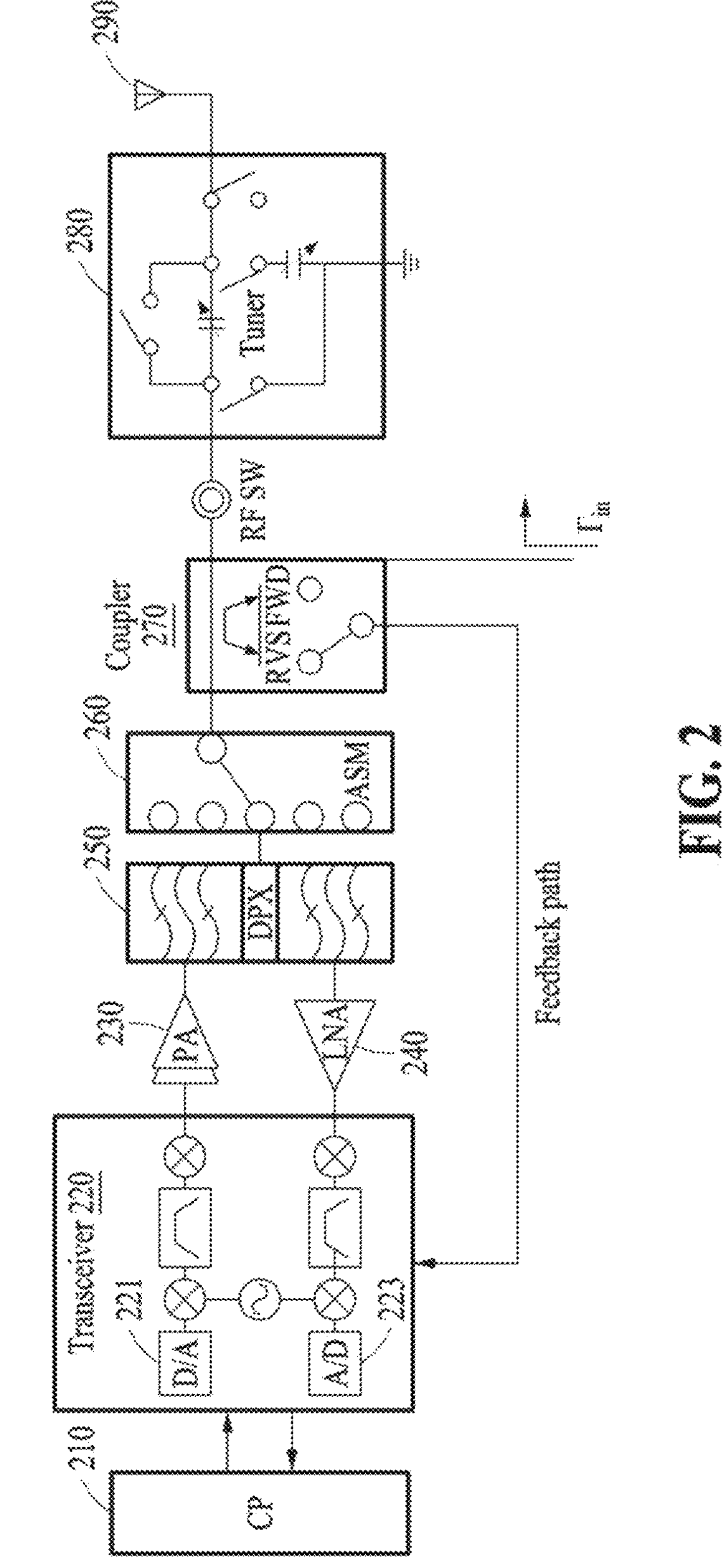
FIG. 2 is a diagram illustrating a wireless communication system according to one or more embodiments of the disclosure.

FIG. 2 is a diagram illustrating a wireless communication system 200 according to one or more embodiments of the disclosure.

Referring to FIG. 2, the wireless communication system 200 (e.g., the wireless communication module 192 of FIG. 1) of an electronic device (e.g., the electronic device 101 of FIG. 1) is shown.

The wireless communication system 200 may include a communication processor (CP) 210 (e.g., the auxiliary processor 123 of FIG. 1), a transceiver 220, a power amplifier (PA) 230, a low noise amplifier (LNA) 240, a duplexer (DPX) 250, an antenna switching module (ASM) 260, a coupler 270, a tuner 280, and an antenna 290 (e.g., the antenna module 197 of FIG. 1). FIG. 2 shows only the components related to the present embodiments. Therefore, it is obvious to those skilled in the art that the wireless communication system 200 may further include other general-purpose components in addition to the components shown in FIG. 2.

The CP 210 may control the other components to transmit and/or receive wireless signals between the electronic device and an external electronic device (e.g., the electronic device 104 of FIG. 1) different from the electronic device. For example, the CP 210 may receive a request to transmit data to the external electronic device from a processor (e.g., the processor 120 of FIG. 1). In response to the request, the CP 210 may transmit a transmission signal (e.g., a digital data signal) having a base-band frequency band based on the data to the transceiver 220.

The transceiver 220 may include a digital-to-analog converter (DAC) 221 and an analog-to-digital converter (ADC) 223. The transceiver 220 may convert the transmission signal into an analog signal using the DAC 221. The transceiver 220 may convert a reception signal received through the antenna 290 into a digital signal. According to one or more embodiments, the transceiver 220 may convert a signal fed back through the coupler 270 into a digital signal using the ADC 223.

The PA 230 may amplify the transmission signal input from the transceiver 220. The LNA 240 may amplify the reception signal applied to the antenna 290 and transmit the amplified reception signal to the transceiver 220. The DPX 250 may filter each of the transmission signal and the reception signal. The ASM 260 may select each band signal.

The coupler 270 may couple the transmission signal transmitted to the antenna 290 and transmit the transmission signal to the transceiver 220 through a feedback path.

The tuner 280 may be connected to the coupler 270. The tuner 280 may adjust the impedance of the antenna 290 to be close to at least one reference impedance based on a tuner code selected or calculated by the processor and/or the CP 210. The tuner 280 may include one or more of a switch, a resistor, an inductor, or a capacitor.

In order to determine whether the electronic device is gripped by a user, the reflection coefficient (i.e., gamma) of the antenna 290 may be obtained in real time. In other words, the reflection coefficient $\Gamma_{in}$ when the antenna 290 is viewed from an input of the tuner 280 may be obtained in real time. Herein, gripping may refer to a state in which the electronic device is in contact with the body of the user. Conversely, when the electronic device is under no effect from the outside (e.g., not in contact with the body of the user), then it may be called a free state. Hereinafter, a method of determining whether the electronic device is gripped using the obtained reflection coefficient will be described.

Figure 3:
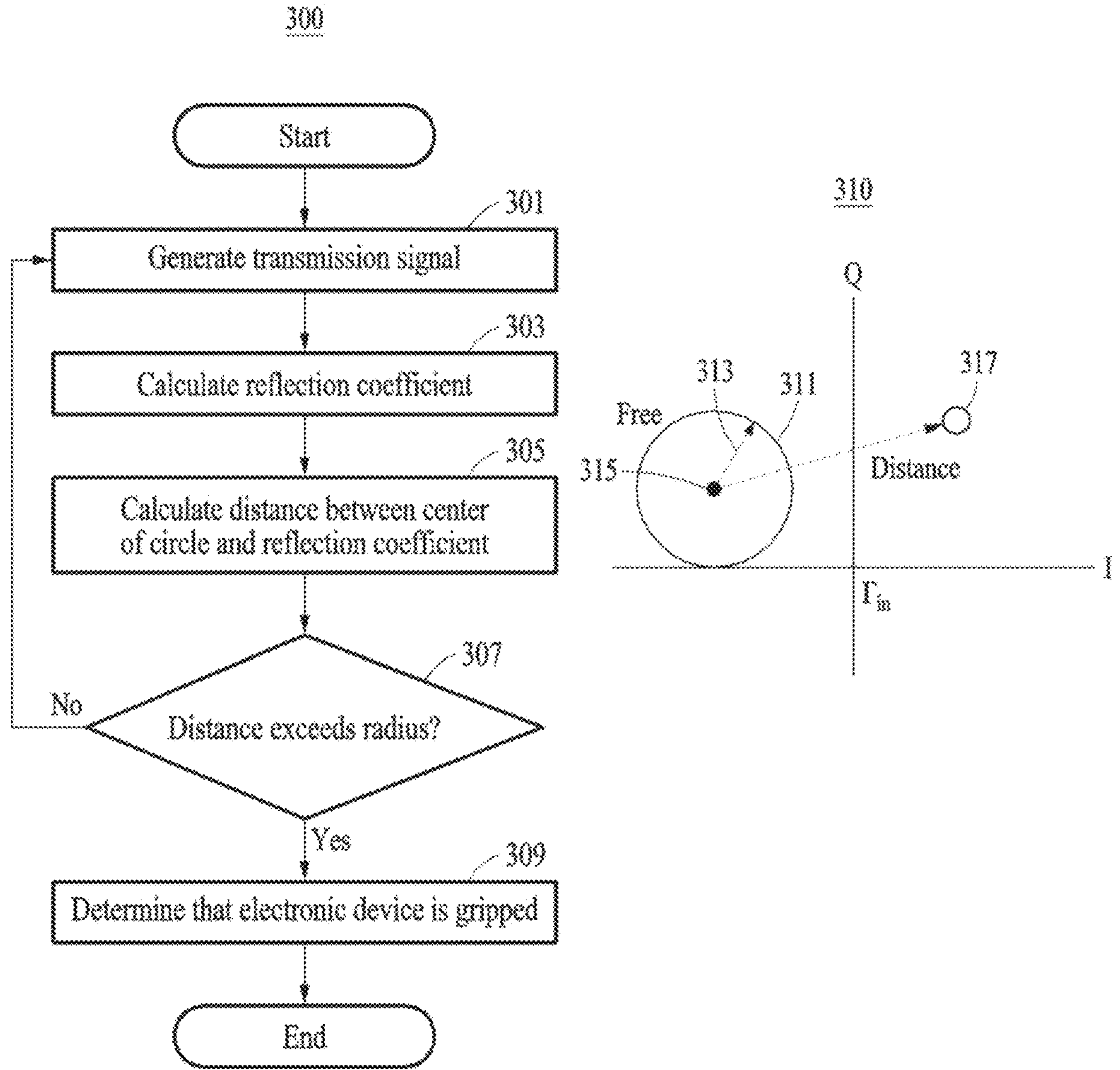
FIG. 3 is a diagram illustrating a flowchart and a complex plane to determine whether an electronic device is gripped using a reflection coefficient according to one or more embodiments of the disclosure.

FIG. 3 is a diagram illustrating a flowchart 300 and a complex plane 310 to determine whether an electronic device is gripped using a reflection coefficient according to one or more embodiments of the disclosure.

Referring to FIG. 3, the flowchart 300 and the complex plane 310 are shown.

In the flowchart 300, operations may be performed sequentially, but are not necessarily performed sequentially. For example, the operations may be performed in different orders, and at least two of the operations may be performed in parallel. The operations shown in the flowchart 300 may be performed by at least one component of an electronic device (e.g., the electronic device 101 of FIG. 1).

In operation 301, the electronic device may generate a transmission signal.

The electronic device may transmit the generated transmission signal to an external electronic device (e.g., the electronic device 104 of FIG. 1). At this time, reflection may occur due to an impedance difference between an antenna (e.g., the antenna module 197 of FIG. 1 and the antenna 290 of FIG. 2) and components connected to the antenna.

In operation 303, the electronic device may calculate a reflection coefficient for the transmission signal. The electronic device may control a sampling rate and a sampling count for an ADC (e.g., the ADC 223 of FIG. 2) of a transceiver (e.g., the transceiver 220 of FIG. 2) based on the resource block (RB) size of the transmission signal. Systemically, the memory size is limited, and a time interval and a sampling time for obtaining a forward/reverse signal should be within 1 millisecond (ms) to obtain the reflection coefficient. Therefore, the sampling rate and the sampling count may be set appropriately. A method of controlling the sampling rate and the sampling count based on the RB size will be further described with reference to FIGS. 4 to 9.

In operation 305, the electronic device may calculate the distance between a center 315 of a circle 311 and a reflection coefficient 317.

The circle 311 may be a reference for a predetermined value of the reflection coefficient on the complex plane 310 to determine whether the electronic device is gripped. The circle 311 may have, as the center 315, the reflection coefficient determined when the electronic device is not gripped by the user. In other words, the circle 311 may have, as the center 315, the reflection coefficient determined when the electronic device is in a free state. The center 315 may be determined differently for each frequency band. The center 315 may be determined to be the average value of experimental values for each frequency band. However, the method of determining the center 315 described above is only an example, and the disclosure is not limited thereto. The electronic device may display the circle 311 and the reflection coefficient 317 on the complex plane 310. The electronic device may calculate the distance between the center 315 of the circle 311 and the reflection coefficient 317 on the complex plane 310.

A formula for obtaining the distance between points on a two-dimensional plane may be used. For example, it may be assumed that the center 315 of the circle 311 is $(a_1, b_1)$, and the reflection coefficient 317 is $(a_2, b_2)$. At this time, the distance between the center 315 and the reflection coefficient 317 may be calculated as $\sqrt{(a_1-a_2)^2+(b_1-b_2)^2}$.

In operation 307, the electronic device may determine whether the distance calculated in operation 305 exceeds a radius 313 of the circle 311.

The electronic device may determine whether the reflection coefficient 317 is present outside the circle 311.

According to one or more embodiments, as the radius 313 of the circle 311 is smaller, the electronic device may respond to an external influence more sensitively. For example, the electronic device may determine without error (accurately) that the electronic device is gripped by the user as the radius 313 of the circle 311 is smaller. For example, in a frequency band N1, a change value of the reflection coefficient depending on whether the electronic device is gripped decreases as the frequency increases. In other words, whether the electronic device is gripped may be determined accurately as the radius 313 of the circle 311 is smaller. The radius 313 of the circle 311 may be determined differently for each frequency band. The radius 313 may be determined experimentally.

On the other hand, as the radius 313 of the circle 311 is greater, the electronic device may respond to an external influence more insensitively. For example, the electronic device may determine more that the electronic device is in a free state as the radius 313 of the circle 311 is greater. Therefore, it may be important to appropriately set the radius 313 of the circle 311.

In operation 309, the electronic device may determine that the electronic device is gripped by the user when the distance from the center 315 to the reflection coefficient 317 exceeds the radius 313. The electronic device may determine whether the electronic device is gripped by the user using the reflection coefficient 317, without a separate sensor.

When it is determined that the electronic device is gripped by the user, the electronic device may perform a subsequent operation. According to one or more embodiments, the impedance of the antenna may change when the electronic device is gripped by the user. The impedance difference between the antenna and the other components connected to the antenna may further increase. The electronic device may cause a tuner (e.g., the tuner 280 of FIG. 2) to adjust the impedance as the subsequent operation. According to one or more embodiments, when it is determined that the electronic device is gripped by the user, the electronic device may reduce the transmission power to protect the user.

Operations 301 to 307 may be iteratively performed. In other words, operations 301 to 307 may be iteratively performed at predetermined intervals.

The electronic device may transmit the transmission signal in various frequency bands (e.g., the N3 band of 1710 MHz to 1785 MHz) to the external electronic device. At this time, the reflection coefficient in a free state may differ in each of the frequency bands. Each of the frequency bands may have a circle 311 with a different center 315. The circle 311 of each of the frequency bands may have a different radius 313. The radius 313 may be set smaller as the frequency band increases. The electronic device may store the center 315 and the radius 313 of the circle 311 for each frequency band as a lookup table (LUT).

Hereinafter, a method of obtaining the reflection coefficient will be described.

Figure 4:
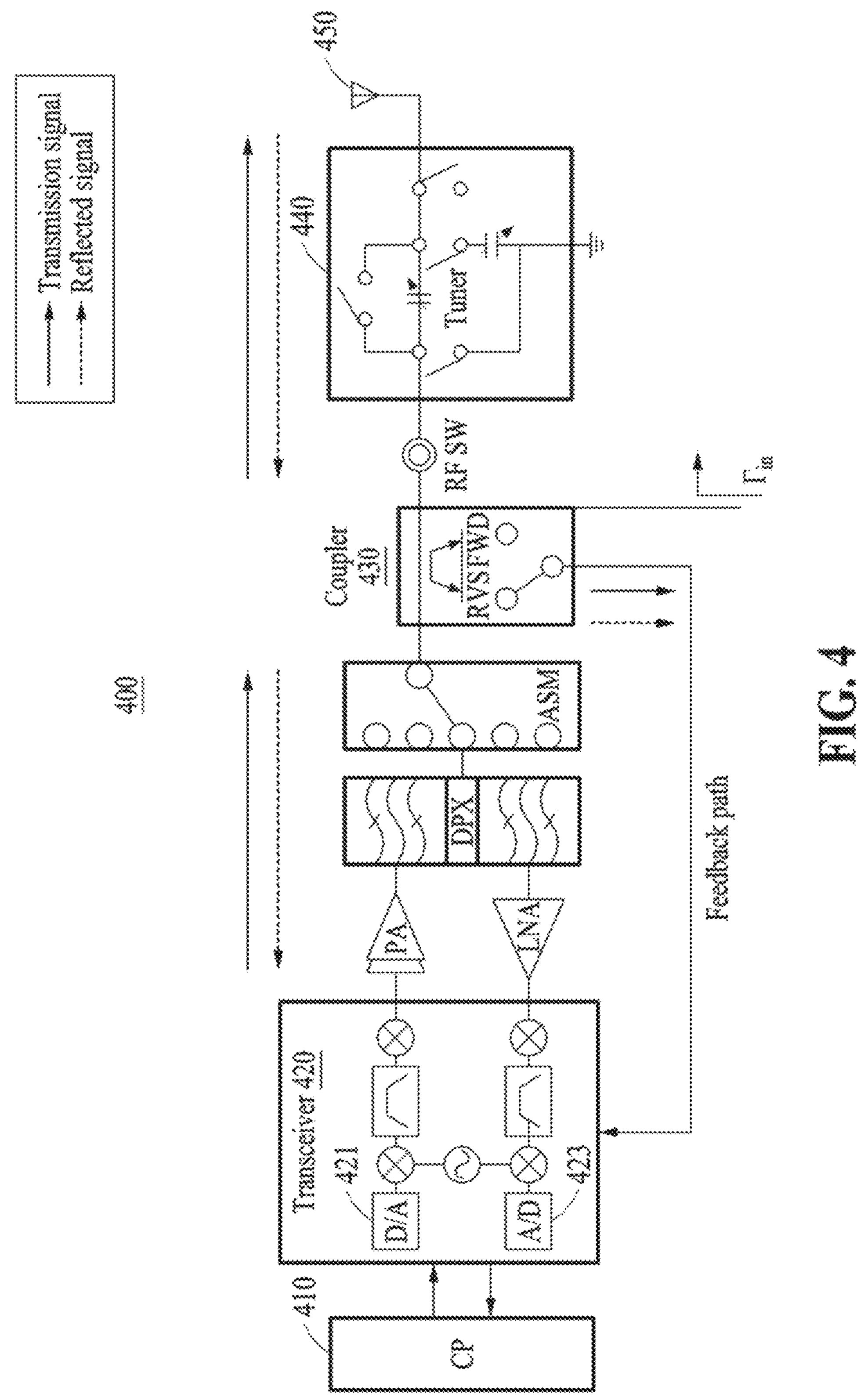
FIG. 4 is a diagram illustrating a wireless communication system to obtain a reflection coefficient according to one or more embodiments of the disclosure.

FIG. 4 is a diagram illustrating a wireless communication system to obtain a reflection coefficient according to one or more embodiments of the disclosure.

Referring to FIG. 4, a wireless communication system 400 (e.g., the wireless communication system 200 of FIG. 2) is shown.

The description of the components included in the wireless communication system 400 has been described above with reference to FIG. 2 and thus, will be omitted.

A CP 410 (e.g., the auxiliary processor 123 of FIG. 1 and the CP 210 of FIG. 2) may transmit a first transmission signal to an external electronic device (e.g., the electronic device 104 of FIG. 1) through a transceiver 420.

The transceiver 420 may convert the first transmission signal into an analog signal using a DAC 421 (e.g., the DAC 221 of FIG. 2). The first transmission signal converted into an analog signal may be transmitted to the external electronic device through an antenna 450 (e.g., the antenna module 197 of FIG. 1 and the antenna 290 of FIG. 2). A portion of the first transmission signal converted into an analog signal may be received from a coupler 430 to the transceiver 420 through a feedback path. The coupler 430 may include a forward switch and a reverse switch. A portion of the first transmission signal converted into an analog signal may be fed back to the transceiver 420 through any one of the forward switch and the reverse switch. For example, a portion of the converted first transmission signal may be fed back to the transceiver 420 through the forward switch.

The remaining portion of the first transmission signal converted into an analog signal, excluding the portion fed back to the transceiver 420 through the feedback path, may be reflected at a tuner 440 (e.g., the tuner 280 of FIG. 2) and/or the antenna 450. A portion of the reflected signal may be fed back to the transceiver 420 through any one of the forward switch and the reverse switch of the coupler 430. For example, the portion of the reflected signal may be fed back to the transceiver 420 through the forward switch of the coupler 430 and the feedback path. The signal, fed back through the forward switch of the coupler 430, converted into a digital signal by the ADC 423 may be referred to as a forward signal. The forward signal may be a signal corresponding to the first transmission signal received by the transceiver from the coupler through the feedback path.

The CP 410 may transmit a second transmission signal to the external electronic device through the transceiver 420. The RB size of the second transmission signal and the RB size of the first transmission signal may be the same. The frequency band of the second transmission signal and the frequency band of the first transmission signal may be the same. The first transmission signal and the second transmission signal may be included in a digital transmission signal.

The transceiver 420 may convert the second transmission signal into an analog signal using the DAC 421. The second transmission signal converted into an analog signal may be transmitted to the external electronic device through the antenna 450. A portion of the second transmission signal converted into an analog signal may be received from a coupler 430 to the transceiver 420 through a feedback path. A portion of the second transmission signal converted into an analog signal may be fed back to the transceiver 420 through any one of the forward switch and the reverse switch. Since the first transmission signal converted into an analog signal is fed back through the forward switch, a portion of the second transmission signal converted into an analog signal may be fed back to the transceiver 420 through the reverse switch.

The remaining portion of the second transmission signal converted into an analog signal, excluding the portion fed back to the transceiver 420 through the feedback path, may be reflected at the tuner 440 and/or the antenna 450. A portion of the reflected signal may be fed back to the transceiver 420 through the reverse switch of the coupler 430. The signal, fed back through the reverse switch of the coupler 430, converted into a digital signal by the ADC 423 may be referred to as a reverse signal. The reverse signal may be a signal corresponding to the second transmission signal received by the transceiver from the coupler through the feedback path. The forward signal and the reverse signal may be included in a digital feedback signal.

The CP 410 may convert the signal fed back through the feedback path into a digital signal using the ADC 423. The ADC 423 may sample the signal fed back through the feedback path to convert the fed back signal into the forward signal and the reverse signal. The ADC 423 may sample the fed back signal according to the sampling count and the sampling rate. The CP 410 may control the sampling count and the sampling rate based on the RB size of the first transmission signal and the second transmission signal. The CP 410 may control the sampling count and the sampling rate based on a threshold value of the RB size. The CP 410 may convert the forward signal and the reverse signal into digital signals using the ADC through sampling with the controlled sampling rate and the controlled sampling count.

The CP 410 may convert the signal fed back to the transceiver into a digital feedback signal using sampling information controlled according to the RB size. The sampling information may include one or more of the sampling rate and the sampling count. The CP 410 may control the sampling information based on the threshold value of the RB size. The CP 410 may control the sampling information as first sampling information when the RB size exceeds the threshold value. The CP 410 may control the sampling information as second sampling information when the RB size is less than or equal to the threshold value. The sampling count of the second sampling information may be greater than the sampling count of the first sampling information. The sampling rate of the second sampling information may be less than the sampling rate of the first sampling information.

The CP 410 may calculate a forward voltage using the first transmission signal and the forward signal. The forward voltage may be a correlation value between the first transmission signal and the forward signal. The CP 410 may calculate a reverse voltage using the second transmission signal and the reverse signal. The reverse voltage may be a correlation value between the second transmission signal and the reverse signal.

The CP 410 may determine a reflection coefficient (e.g., the reflection coefficient 317 of FIG. 3) when the antenna 450 is viewed from an input of the tuner 440 (e.g., the tuner 280 of FIG. 2) connected to the coupler 430 using a ratio between the forward voltage and the reverse voltage. The CP 410 may determine the reflection coefficient, which is the ratio of the reverse voltage to the forward voltage. The CP 410 may periodically determine the reflection coefficient.

The CP 410 may display the reflection coefficient on a complex plane (e.g., the complex plane 310 of FIG. 3). The CP 410 may determine whether the electronic device is gripped based on whether the reflection coefficient is displayed outside a circle (e.g., the circle 311 of FIG. 3) displayed on the complex plane. The CP 410 may calculate the distance from the reflection coefficient to the center of the circle. The CP 410 may determine whether the electronic device is gripped based on whether the distance from the reflection coefficient to the center of the circle exceeds the radius (e.g., the radius 313 of FIG. 3) of the circle.

Hereinafter, a method of compensating for an offset in the reflection coefficient displayed on the complex plane according to a frequency will be described.

Figure 5:
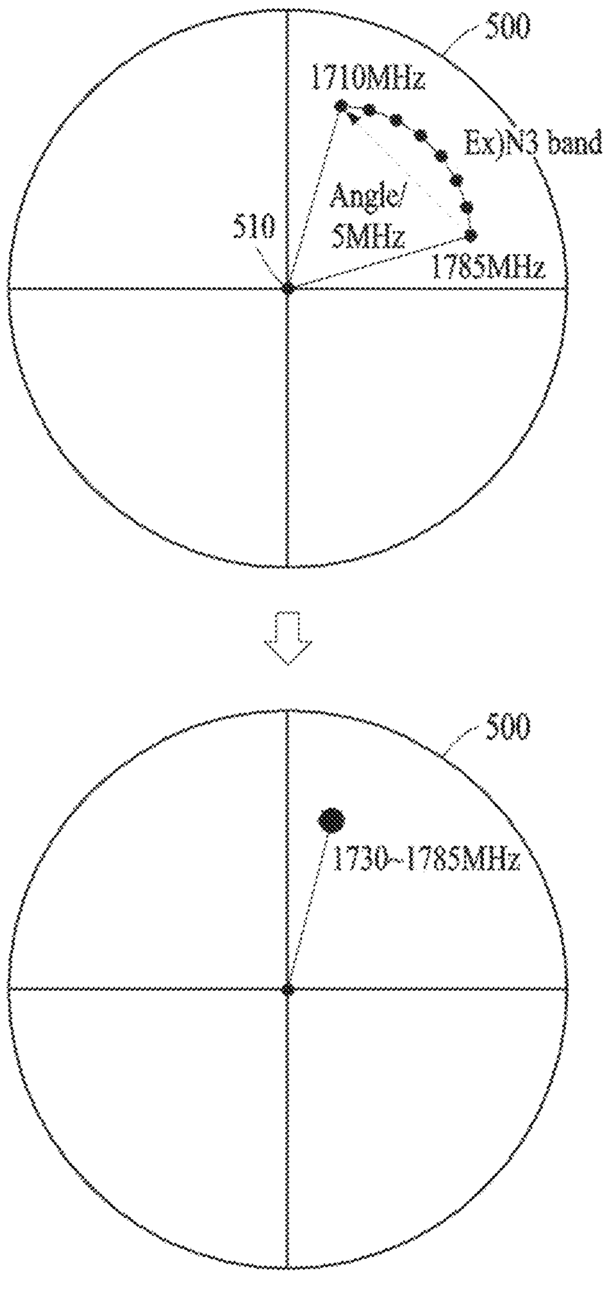
FIG. 5 is a diagram illustrating offset compensation according to one or more embodiments of the disclosure.

FIG. 5 is a diagram illustrating offset compensation according to one or more embodiments of the disclosure.

Referring to FIG. 5, a circle 500 (e.g., the circle 311 of FIG. 3) displayed on a complex plane (e.g., the complex plane 310 of FIG. 3) is shown.

The reflection coefficients of transmission signals included in the same frequency band (e.g., the N3 band of 1710 MHz to 1785 MHz) may be based on the same circle 500. Even if included in the same frequency band, an offset may occur depending on the frequency of a transmission signal. As the frequency increases, a clockwise phase shift may occur. For example, in the N3 band, a reflection coefficient (e.g., the reflection coefficient 317 of FIG. 3) for a transmission signal at 1710 MHz and a reflection coefficient for a transmission signal at 1785 MHz may have an offset of about 7 degrees per 5 MHz in a clockwise direction based on the center 510 (e.g., the center 315 of FIG. 3) of the circle 500. To accurately determine whether an electronic device is gripped by a user, reflection coefficients of transmission signals included in the same frequency band may be concentrated on one point. Therefore, it may be necessary to compensate for the offset of the reflection coefficient that occurs when the frequencies are different.

A CP (e.g., the auxiliary processor 123 of FIG. 1, the CP 210 of FIG. 2, and the CP 410 of FIG. 4) may compensate for an offset. According to one or more embodiments, the CP may calculate a unit angle difference per 1 MHz between the lowest frequency and the highest frequency of the frequency band. The unit angle difference per 1 MHz may be calculated based on the center 510 of the circle 500 to determine whether the electronic device is gripped in the frequency band. The CP may compensate for the offset using the calculated unit angle difference per 1 MHz. The CP may compensate for the calculated offset to concentrate the reflection coefficients of the transmission signals on one point.

Hereinafter, a correlation according to the RB size of a transmission signal will be described.

Figure 6:
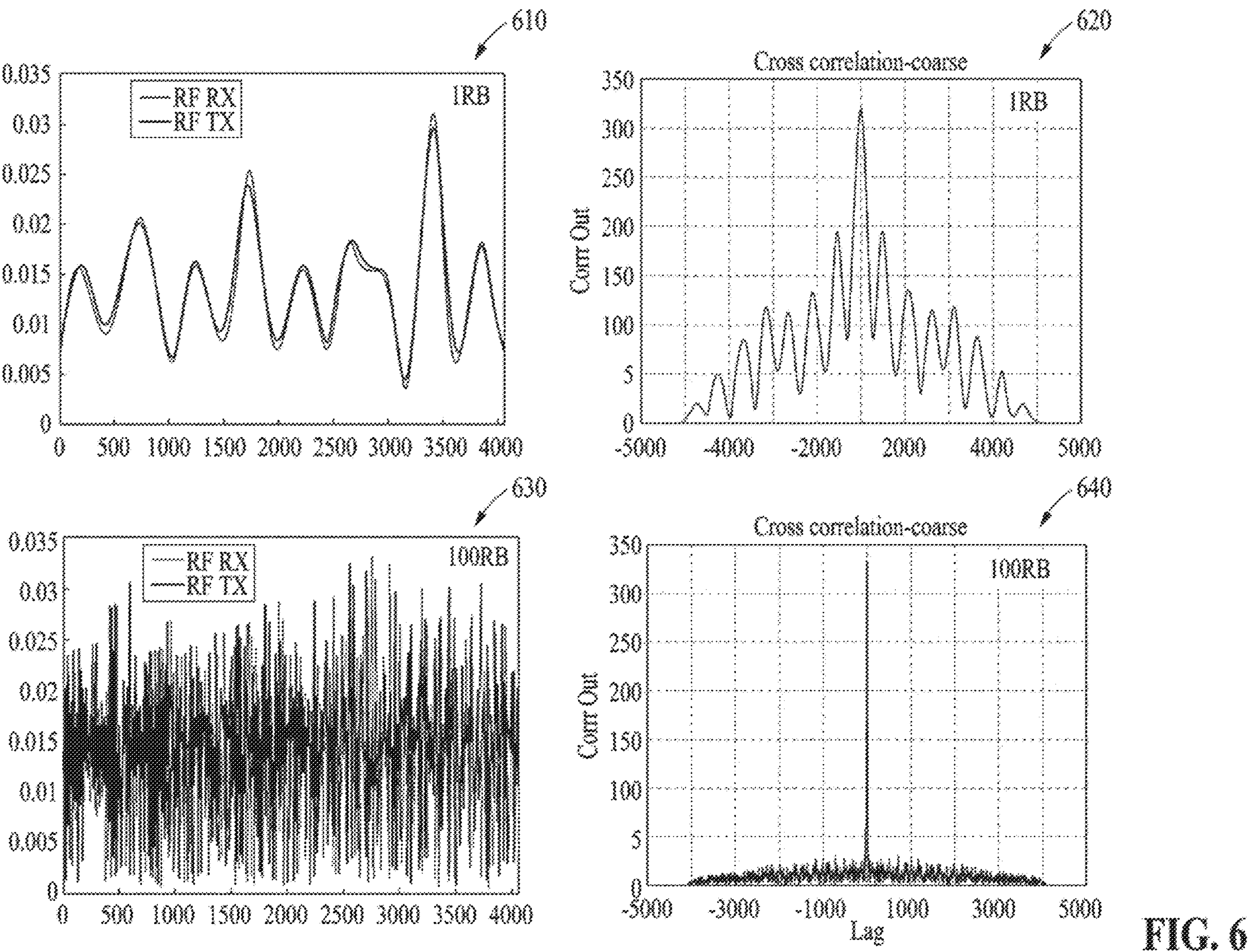
FIG. 6 is a diagram illustrating characteristics according to a resource block (RB) size according to one or more embodiments of the disclosure.

FIG. 6 is a diagram illustrating characteristics according to an RB size according to one or more embodiments of the disclosure.

Referring to FIG. 6, a graph depicting a composite signal and correlation of a transmission signal (e.g., RF TX of FIG. 6) and a feedback signal (e.g., RF RX of FIG. 6) when the RB size is "1" is shown. Referring to FIG. 6, a graph depicting a composite signal and a correlation of a transmission signal and a feedback signal when the RB size is "100" is shown. The feedback signals may be forward signals or reverse signals received by a transceiver through a feedback path.

Comparing a graph 610 and a graph 630, the transmission signal and the feedback signal when the RB size is "1" may be simpler than the transmission signal and the feedback signal when the RB size is "100". In other words, the smaller the RB size, the simpler the transmission signal and the feedback signal may be. If a signal is simple, a correlation may fluctuate even for a slight delay of a feedback signal. On the other hand, if a signal is complex, a correlation may not fluctuate even when a feedback signal is slightly delayed. For example, referring to a graph 620 and a graph 640, a peak value obtained to be greater than the other peaks may be determined to be a correlation value. Referring to the graph 620 when the RB size is "1", the peak value obtained to be greater than the other peaks may be unclear compared to the graph 640 when the RB size is "100". Therefore, when the RB size is "1", the correlation value may fluctuate compared to when the RB size is "100".

Hereinafter, a reflection coefficient (e.g., the reflection coefficient 317 of FIG. 3) according to the RB size will be described.

Figure 7:
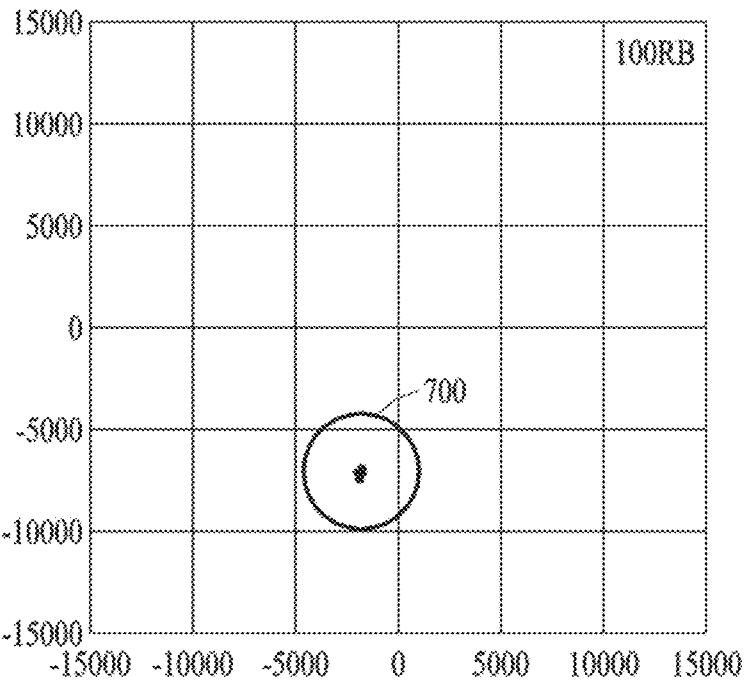
FIG. 7 is a diagram illustrating a correlation according to an RB size according to one or more embodiments of the disclosure.
Figure 7:
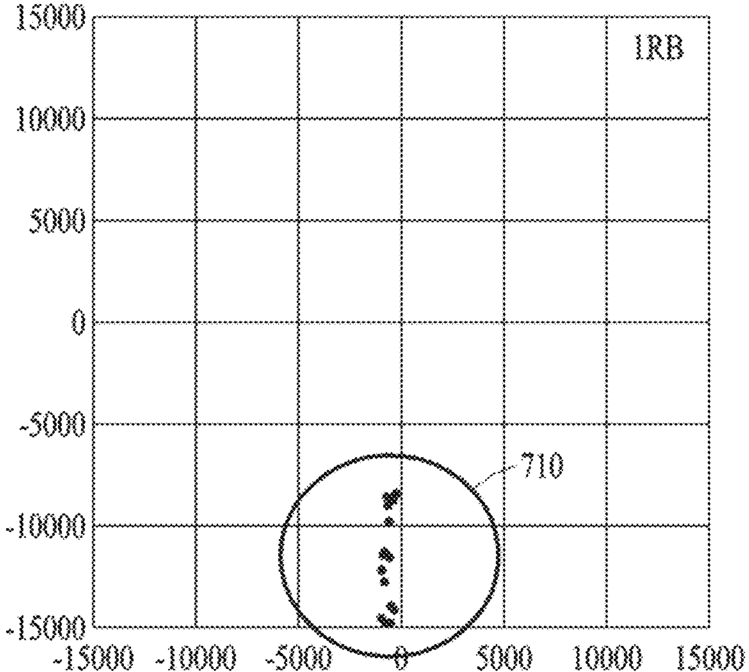

FIG. 7 is a diagram illustrating a correlation according to an RB size according to one or more embodiments of the disclosure.

Referring to FIG. 7, reflection coefficients displayed on a complex plane (e.g., the complex plane 310 of FIG. 3) when the RB size is "100" and when the RB size is "1" are shown.

When the RB size is "100", the correlation value may not fluctuate compared to when the RB size is "1", as described above with reference to FIG. 6. If the correlation value does not fluctuate, the reflection coefficients may also not scatter. Therefore, when the RB size is "100", the reflection coefficients may be more concentrated on one point, compared to when the RB size is "1". When the RB size is "1", the reflection coefficients may scatter rather than being concentrated on one point.

The radius (e.g., the radius 313 of FIG. 3) of a circle 700 (e.g., the circle 311 of FIG. 3) to determine whether an electronic device is gripped when the RB size is "100" may be determined to be less than the radius (e.g., the radius 313 of FIG. 3) of a circle 710 (e.g., the circle 311 of FIG. 3) when the RB size is "1". Since the reflection coefficients are not concentrated on one point when the RB size is "1", the radius of a circle may be determined to be greater when the RB size is "1". Determining the radius to be great may reduce the recognition distance to determine a free state or a gripped state of an electronic device when the RB size is small.

Therefore, the correlation value may be obtained stably even when the RB size is small, to reduce the radius of a circle. Hereinafter, a method of controlling a sampling rate and a sampling count to obtain a correlation value stably will be described.

Figure 8:
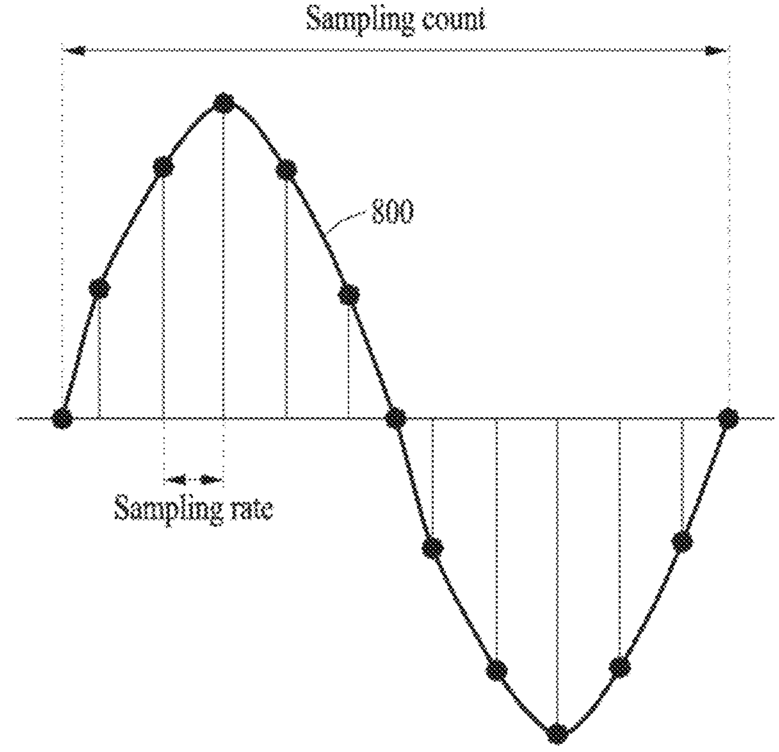
FIG. 8 is a diagram illustrating a sampling rate, a sampling count, and controlling each.
Figure 9:
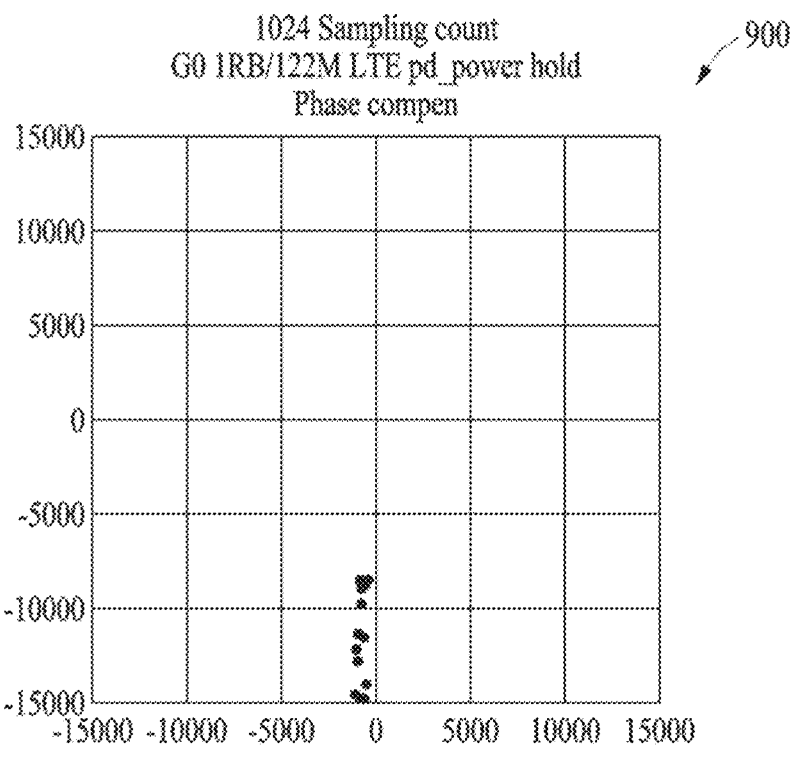
FIG. 9 is a diagram illustrating a sampling rate, a sampling count, and controlling each.
Figure 9:
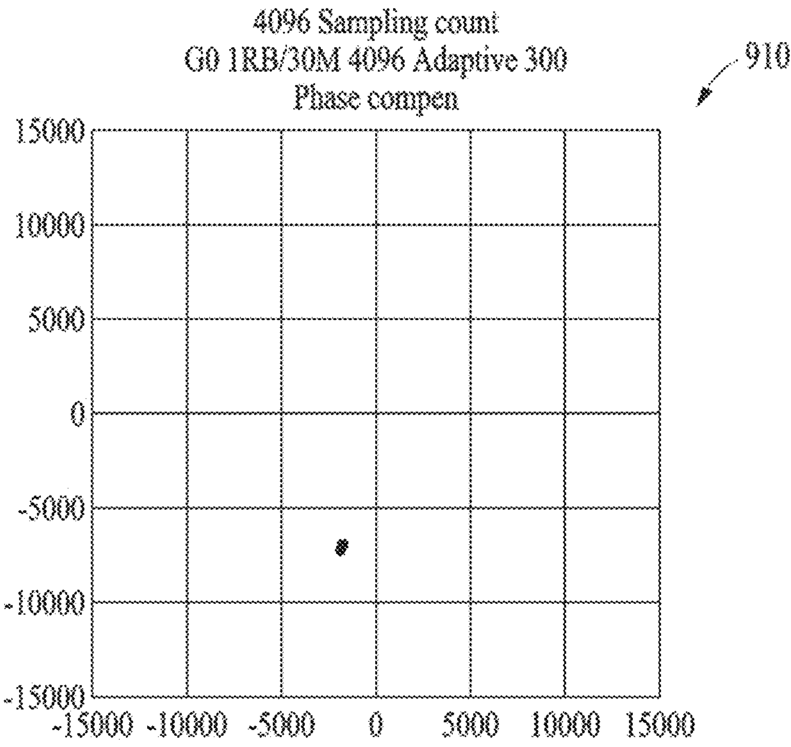

FIGS. 8 and 9 are diagrams illustrating a sampling rate, a sampling count, and controlling each.

Referring to FIG. 8, a feedback signal 800, which is an analog signal, is shown.

Sampling may be performed when converting an analog signal into a digital signal using an ADC (e.g., the ADC 223 of FIG. 2 and the ADC 423 of FIG. 4). The sampling rate may be the number of samples extracted per unit time (e.g., 1 second). The unit of the sampling rate may be hertz (Hz). The sampling count may be the number of samples collected for a predetermined time. The sampling count may be expressed as the product of the sampling rate and the time.

For example, if the analog signal is sampled for 10 seconds at a sampling rate of 250 Hz, then the sampling count may be 2500.

Referring to FIG. 9, reflection coefficients when the sampling rate and the sampling count are varied for the RB size of "1" are shown.

Reducing the sampling rate and increasing the sampling count may prevent the correlation value from fluctuating in the case of a simple signal with a small RB size. For example, assuming that a threshold value of the RB size is "5", 1 RB may be a case where the RB size is within the threshold value. When the RB size is within the threshold value, reducing the sampling rate and increasing the sampling count may be necessary to prevent fluctuation of the correlation value. That is, the reflection coefficients may be concentrated on one point.

A graph 900 of FIG. 9 may be a graph showing reflection coefficients when the sampling rate is 122 MHz and the sampling count is 1024, for 1 RB. A graph 910 of FIG. 9 may show reflection coefficients when the sampling rate is 30 MHz and the sampling count is 4096, for 1 RB.

In other words, when the RB size is within a threshold value, reducing the sampling rate and increasing the sampling count may cause the reflection coefficients to be concentrated on one point. Conversely, when the RB size is within the threshold value, increasing the sampling rate and reducing the sampling count may cause the reflection coefficients to scatter. When the reflection coefficients scatter, whether an electronic device is gripped may be determined incorrectly.

In conclusion, the RB size may be changed dynamically. The RB size of the transmission signal may be changed continuously. Reducing the sampling rate and increasing the sampling count when the RB size is great (i.e., exceeds a threshold value), an inaccurate reflection coefficient may be obtained. Conversely, sampling by increasing the sampling rate and reducing the sampling count when the RB size is small, an inaccurate reflection coefficient may be obtained. Therefore, the sampling rate and the sampling count may be set differently depending on the RB size.

A CP (e.g., the auxiliary processor 123 of FIG. 1, the CP 210 of FIG. 2, and the CP 410 of FIG. 4) may determine whether the RB size exceeds the threshold value. The CP may control the sampling count and the sampling rate according to whether the RB size exceeds the threshold value. The CP may control the sampling rate when the RB size is less than or equal to the threshold value to be smaller than the sampling rate when the RB size exceeds the threshold value. For example, the CP may control the sampling rate when the RB size is less than or equal to the threshold value to be ¼ of the sampling rate when the RB size exceeds the threshold value.

The CP may control the sampling count when the RB size is less than or equal to the threshold value to be greater than the sampling count when the RB size exceeds the threshold value. For example, the CP may control the sampling count when the RB size is less than or equal to the threshold value to be 4 times the sampling count when the RB size exceeds the threshold value.

According to one or more embodiments, the CP may check the size and phase of a reflection coefficient in real time when the RB size is less than or equal to the threshold value. The CP may not use a reflection coefficient to determine whether the electronic device is gripped, if the reflection coefficient changes only in size but not in phase on a complex plane when the RB size is less than or equal to the threshold value. This may increase the stability of reflection coefficients used to determine whether the electronic device is gripped.

Figure 10:
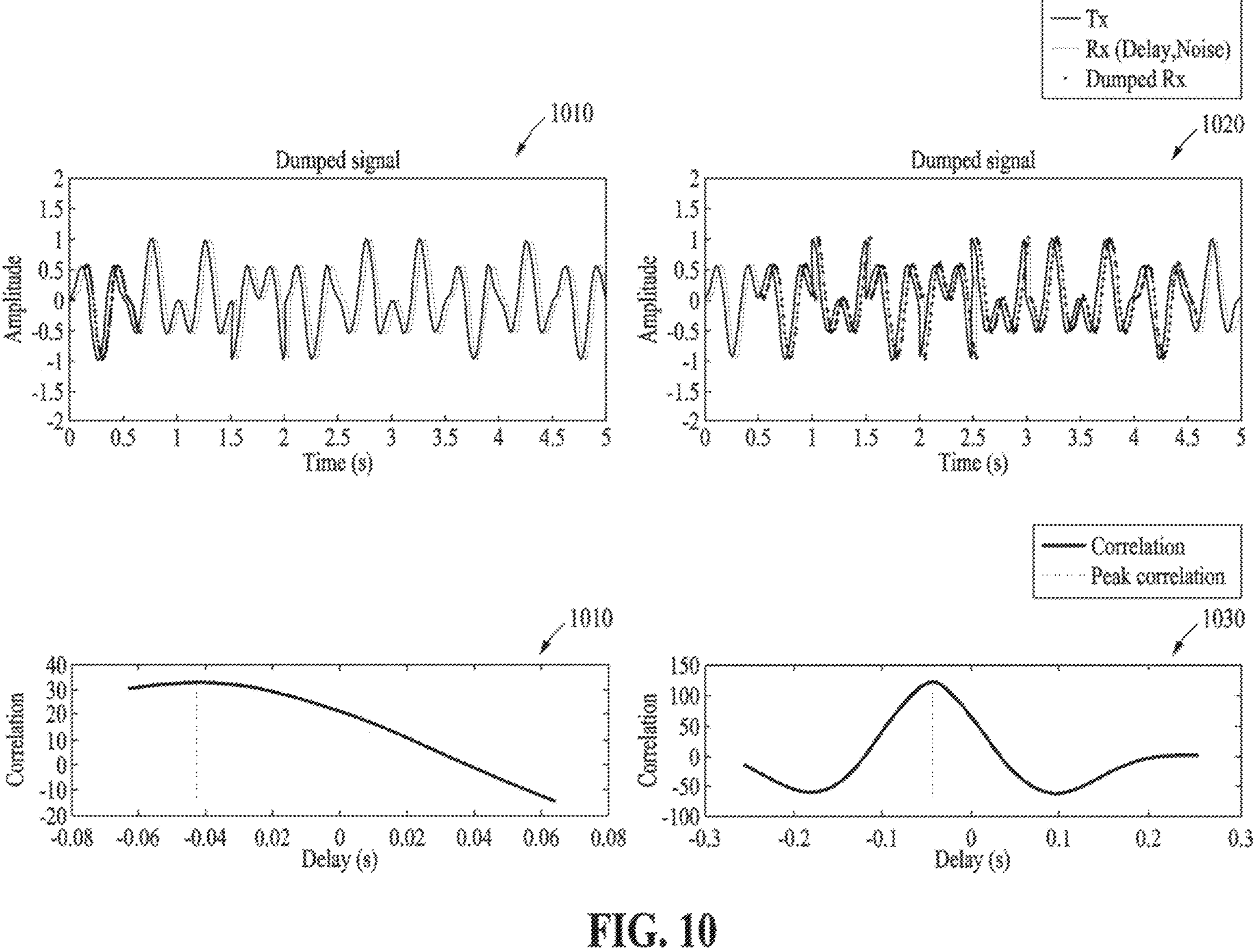
FIG. 10 is a diagram illustrating simulation results of correlation values when a sampling count and a sampling rate are varied according to one or more embodiments of the disclosure.

FIG. 10 is a diagram illustrating simulation results of correlation values when a sampling count and a sampling rate are varied according to one or more embodiments of the disclosure.

FIG. 10 shows simulation results of correlation values in a first condition and a second condition when the RB size is less than or equal to a threshold value. The first condition may be a sampling rate of 250 Hz and a sampling count of 128. The second condition may be a sampling rate of 125 Hz and a sampling count of 512. In other words, the second condition may have a lower sampling rate and a higher sampling count than the first condition. As described above with reference to FIG. 9, if the RB size is less than or equal to the threshold value, an accurate reflection coefficient may be obtained only when reducing the sampling rate and increasing the sampling count.

A graph 1000 may be a graph of sampling a reverse signal under the first condition. In other words, the graph 1000 may be a graph of sampling 128 samples from the reverse signal at a sampling rate of 250 Hz. A graph 1010 may be a graph of a correlation value under the first condition.

A graph 1020 may be a graph of sampling a reverse signal under the second condition. In other words, the graph 1020 may be a graph of sampling 512 samples from the reverse signal at a sampling rate of 125 Hz. A graph 1030 may be a graph of a correlation value under the second condition.

Comparing the graph 1010 and the graph 1030, the resolution of the graph 1030 may be higher than that of the graph 1010. Comparing the graph 1010 and the graph 1030, the correlation value of the graph 1030 may be greater than that of the graph 1010. In other words, when the RB size is less than or equal to the threshold value, reducing the sampling rate and increasing the sampling count may increase the correlation value. Conversely, when the RB size exceeds the threshold value, increasing the sampling rate and reducing the sampling count may increase the correlation value. Therefore, the sampling rate and the sampling count may be controlled depending on whether the RB size exceeds the threshold value.

Figure 11:
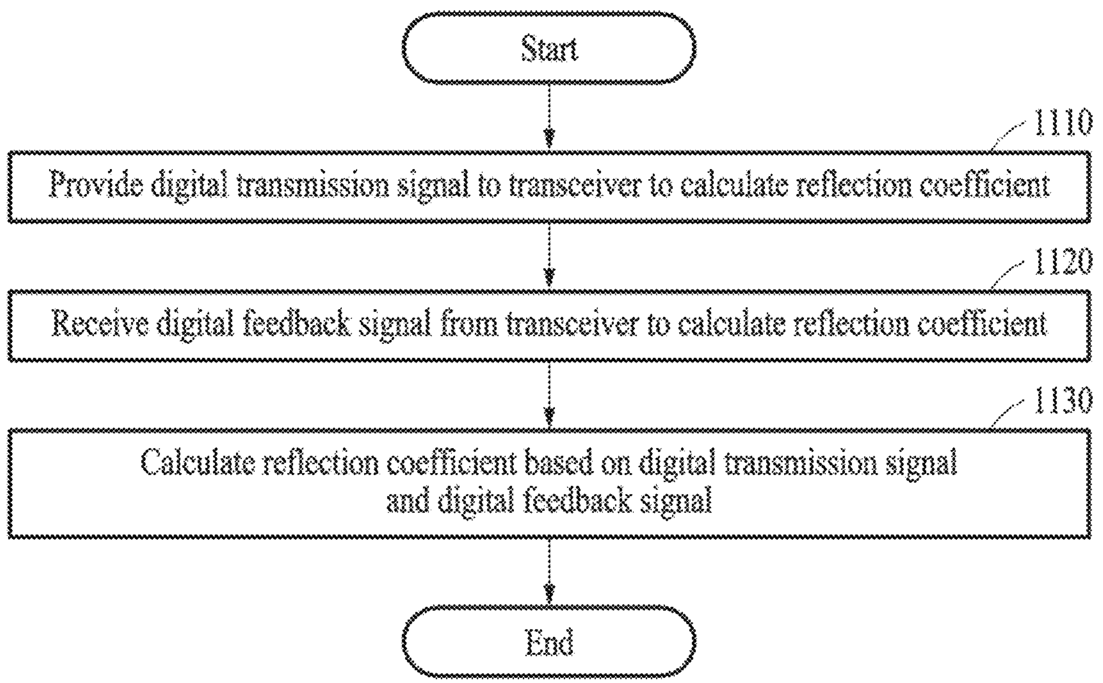
FIG. 11 is a flowchart illustrating an operating method of an electronic device according to one or more embodiments of the disclosure.

FIG. 11 is a flowchart illustrating an operating method of an electronic device according to one or more embodiments of the disclosure.

In the following embodiments, operations may be performed sequentially, but are not necessarily performed sequentially. For example, the operations may be performed in different orders, and at least two of the operations may be performed in parallel. The operations shown in FIG. 11 may be performed by at least one component of an electronic device (e.g., the electronic device 101 of FIG. 1).

In operation 1110, the electronic device may provide a digital transmission signal to a transceiver to calculate a reflection coefficient.

The electronic device may include a transceiver (e.g., the transceiver 220 of FIG. 2 and the transceiver 420 of FIG. 4) including an ADC (e.g., the ADC 223 of FIG. 2 and the ADC 423 of FIG. 4) and a DAC. The electronic device may include a coupler (e.g., the coupler 270 of FIG. 2 and the coupler 430 of FIG. 4) connected to the transceiver through a feedback path.

In operation 1120, the electronic device may receive a digital feedback signal from the transceiver to calculate the reflection coefficient.

In operation 1130, the electronic device may calculate the reflection coefficient based on the digital transmission signal and the digital feedback signal.

The digital transmission signal may be converted into an analog signal by the DAC of the transceiver. The digital feedback signal may be converted into a digital signal by the ADC of the transceiver based on sampling information controlled according to the RB size of the digital transmission signal.

The descriptions provided above with reference to FIGS. 1 to 9 may apply to the operations shown in FIG. 11, and thus, a further detailed description thereof will be omitted.

According to one or more embodiments, the digital transmission signal may include a first transmission signal and a second transmission signal. The digital feedback signal may include a forward signal received by a CP in response to the provision of the first transmission signal, and a reverse signal received by the CP in response to the provision of the second transmission signal.

According to one or more embodiments, the sampling information may include one or more of a sampling rate and a sampling count.

According to one or more embodiments, the operating method of the electronic device may further include an operation of determining whether the electronic device is gripped using the reflection coefficient.

According to one or more embodiments, in the operation of determining whether the electronic device is gripped using the reflection coefficient, the reflection coefficient may be displayed on a complex plane (e.g., the complex plane 310 of FIG. 3), and it may be determined that the electronic device is gripped by a user when the reflection coefficient is displayed outside a circle (e.g., the circle 311 of FIG. 3) displayed on the complex plane. The circle may have, as the center, the reflection coefficient determined when the electronic device is not gripped.

According to one or more embodiments, the circle may have a different center depending on a frequency band, and have a different radius (e.g., the radius 313 of FIG. 3) depending on the frequency band.

According to one or more embodiments, the radius may be determined to be smaller as the frequency band is larger.

According to one or more embodiments, a forward voltage may be a correlation value between the first transmission signal and the forward signal. A reverse voltage may be a correlation value between the second transmission signal and the reverse signal.

According to one or more embodiments, a computer-readable recording medium may store a program for executing the operating method described above.

According to one or more embodiments, the electronic device may control a sampling rate and a sampling count to convert an analog signal into a digital signal based on whether the RB size of the first transmission signal and the second transmission signal transmitted through the transceiver exceeds a threshold value. The electronic device may convert the forward signal and the reverse signal into digital signals through sampling with the controlled sampling rate and the controlled sampling count. The forward voltage may be calculated using the first transmission signal and the converted forward signal. The reverse voltage may be calculated using the second transmission signal and the converted reverse signal. The electronic device may determine a reflection coefficient when an antenna is viewed from an input of a tuner connected to the coupler using a ratio between the forward voltage and the reverse voltage. The forward signal may be a signal corresponding to the first transmission signal received by the transceiver from the coupler through the feedback path. The reverse signal may be a signal corresponding to the second transmission signal received by the transceiver from the coupler through the feedback path.

Figure 12:
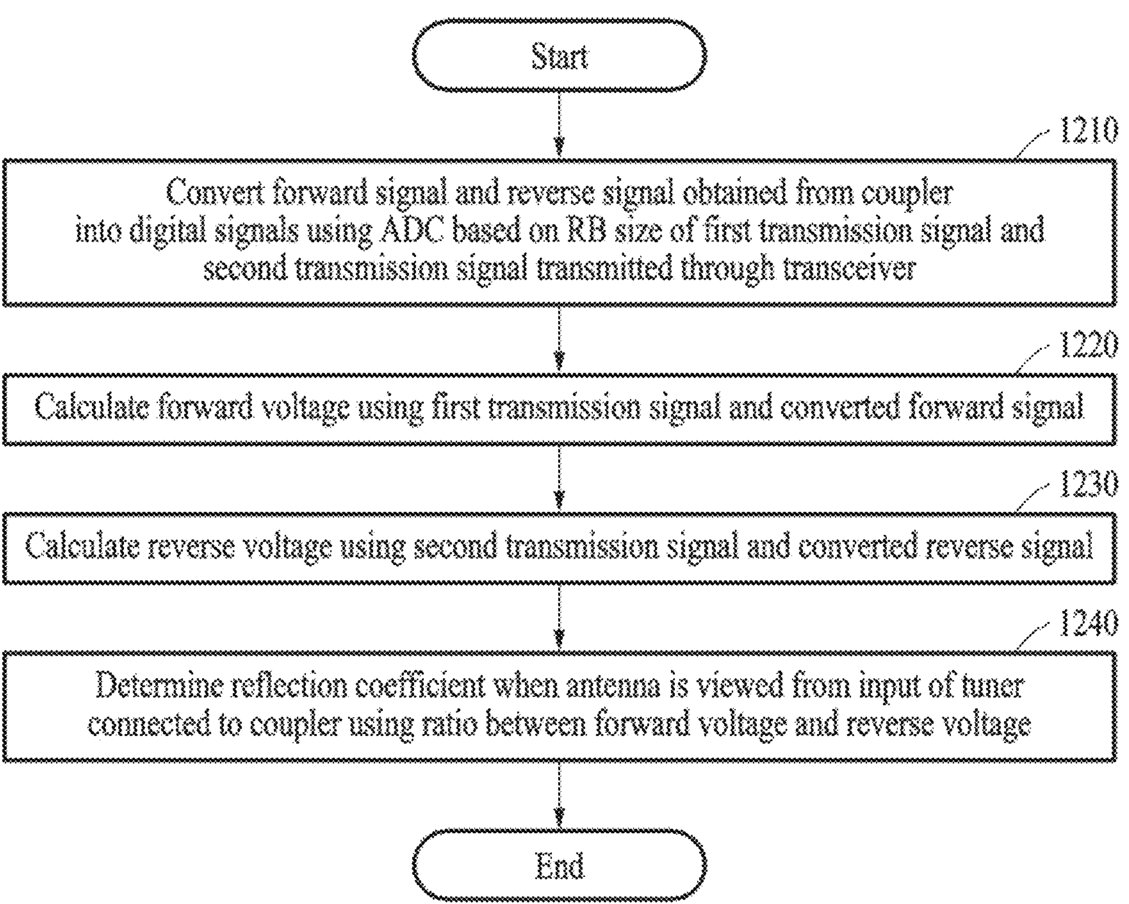
FIG. 12 is a flowchart illustrating an operating method of an electronic device according to one or more embodiments of the disclosure.

FIG. 12 is a flowchart illustrating an operating method of an electronic device according to one or more embodiments of the disclosure.

In the following embodiments, operations may be performed sequentially, but are not necessarily performed sequentially. For example, the operations may be performed in different orders, and at least two of the operations may be performed in parallel. The operations shown in FIG. 12 may be performed by at least one component of an electronic device (e.g., the electronic device 101 of FIG. 1).

In operation 1210, the electronic device may convert a forward signal and a reverse signal obtained from a coupler (e.g., the coupler 270 of FIG. 2 and the coupler 430 of FIG. 4) into digital signals using an ADC (e.g., the ADC 223 of FIG. 2 and the ADC 423 of FIG. 4) based on the RB size of a first transmission signal and a second transmission signal transmitted through a transceiver (e.g., the transceiver 220 of FIG. 2 and the transceiver 420 of FIG. 4).

In operation 1220, the electronic device may calculate a forward voltage using the first transmission signal and the converted forward signal. The forward signal may be a signal corresponding to the first transmission signal received by the transceiver from the coupler through the feedback path.

In operation 1230, the electronic device may calculate a reverse voltage using the second transmission signal and the converted reverse signal. The reverse signal may be a signal corresponding to the second transmission signal received by the transceiver from the coupler through the feedback path.

In operation 1240, the electronic device may determine a reflection coefficient (e.g., the reflection coefficient 317 of FIG. 3) when an antenna (e.g., the antenna module 197 of FIG. 1, the antenna module 290 of FIG. 2, and the antenna 450 of FIG. 4) is viewed from an input of a tuner (e.g., the tuner 280 of FIG. 2 and the tuner 440 of FIG. 4) connected to the coupler using a ratio between the forward voltage and the reverse voltage.

The descriptions provided above with reference to FIGS. 1 to 9 may apply to the operations shown in FIG. 11, and thus, a further detailed description thereof will be omitted.

According to one or more embodiments, the operation of converting the forward signal and the reverse signal into digital signals using the ADC may include an operation of controlling a sampling rate and a sampling count to convert an analog signal into a digital signal based on a threshold value of the RB size. The operation of converting the forward signal and the reverse signal into digital signals using the ADC may include an operation of converting the forward signal and the reverse signal into digital signals using the ADC through sampling with the controlled sampling rate and the controlled sampling count.

According to one or more embodiments, in the operation of controlling the sampling rate and sampling count, the sampling count when the RB size is less than or equal to the threshold value may be controlled to be greater than the sampling count when the RB size exceeds the threshold value.

According to one or more embodiments, in the operation of controlling the sampling rate and sampling count, the sampling rate when the RB size is less than or equal to the threshold value may be controlled to be less than the sampling rate when the RB size exceeds the threshold value.

The embodiments of the present disclosure disclosed in the specification and the drawings are merely presented to easily describe the technical contents of various embodiments of the present disclosure and help the understanding of them and are not intended to limit the various embodiments. Therefore, all changes or modifications derived from the technical idea of the various embodiments of the present disclosure as well as the embodiments disclosed herein should be construed to fall within the various embodiments.

What is claimed is:

1. An electronic device comprising:
- a transceiver comprising an analog-to-digital converter (ADC) and a digital-to-analog converter (DAC);
- a coupler coupled to the transceiver through a feedback path;
- at least one memory storing instructions; and
- at least one communication processor configured to execute the instructions to:
  - provide a digital transmission signal to the transceiver,
  - receive a digital feedback signal from the transceiver, and
  - obtain a reflection coefficient based on the digital transmission signal and the digital feedback signal,
- wherein the DAC is configured to convert the digital transmission signal into an analog signal, and
- wherein the ADC is configured to convert a signal into a digital signal to obtain the digital feedback signal, based on sampling information controlled according to a resource block size of the digital transmission signal.

2. The electronic device of claim 1, wherein the digital transmission signal comprises a first transmission signal and a second transmission signal, and
- wherein the digital feedback signal comprises a forward signal received by the at least one communication processor in response to provision of the first transmission signal, and a reverse signal received by the at least one communication processor in response to provision of the second transmission signal.

3. The electronic device of claim 2, wherein the reflection coefficient is determined based on a ratio between a forward voltage and a reverse voltage,
- wherein the forward voltage is a correlation value between the first transmission signal and the forward signal, and
- wherein the reverse voltage is a correlation value between the second transmission signal and the reverse signal.

4. The electronic device of claim 1, wherein the sampling information comprises at least one of a sampling rate and a sampling count.

5. The electronic device of claim 1, wherein the at least one communication processor is further configured to execute the instructions to:
- control the sampling information based on a threshold value of the resource block size;
- control the sampling information as first sampling information based on the resource block size exceeding the threshold value, and
- control the sampling information as second sampling information based on the resource block size being less than or equal to the threshold value.

6. The electronic device of claim 5, wherein a sampling count of the second sampling information is greater than a sampling count of the first sampling information.

7. The electronic device of claim 5, wherein a sampling rate of the second sampling information is less than a sampling rate of the first sampling information.

8. The electronic device of claim 1, wherein the at least one communication processor is further configured to execute the instructions to determine whether the electronic device is gripped using the reflection coefficient.

9. The electronic device of claim 1,
- wherein the at least one communication processor is further configured to execute the instructions to display the reflection coefficient on a complex plane, and determine that the electronic device is gripped by a user based on the reflection coefficient being displayed outside a circle displayed on the complex plane, and
- wherein the circle has, as a center, a reflection coefficient determined based on the electronic device being not gripped.

10. The electronic device of claim 9, wherein the circle has a center that differs depending on a frequency band, and has a radius that differs depending on the frequency band.

11. The electronic device of claim 10, wherein the radius is determined to be smaller as the frequency band increases.

12. An electronic device comprising:
- a transceiver comprising an analog-to-digital converter (ADC);
- a coupler coupled to the transceiver through a feedback path;
- at least one memory storing instructions; and
- at least one communication processor configured to execute the instructions to:
  - control a sampling rate and a sampling count to convert an analog signal into a digital signal based on whether a resource block size of a first transmission signal and a second transmission signal transmitted through the transceiver exceeds a threshold value;
  - convert a forward signal and a reverse signal into digital signals through sampling with the controlled sampling rate and the controlled sampling count;
  - obtain a forward voltage based on the first transmission signal and the converted forward signal;
  - obtain a reverse voltage based on the second transmission signal and the converted reverse signal; and
  - identify a reflection coefficient of an antenna with respect to from an input of a tuner connected to the coupler based on a ratio between the forward voltage and the reverse voltage,
- wherein the forward signal corresponds to the first transmission signal received by the transceiver through the feedback path from the coupler, and
- wherein the reverse signal corresponds to the second transmission signal received by the transceiver through the feedback path from the coupler.

13. An operating method of an electronic device, the operating method comprising:
- providing a digital transmission signal to a transceiver;
- receiving a digital feedback signal from the transceiver; and
- obtaining a reflection coefficient based on the digital transmission signal and the digital feedback signal,
- wherein the digital transmission signal is converted into an analog signal by a digital-to-analog converter (DAC) of the transceiver, and
- wherein the digital feedback signal is converted into a digital signal by an analog-to-digital converter (ADC) of the transceiver based on sampling information controlled according to a resource block size of the digital transmission signal.

14. The operating method of claim 13, wherein the digital transmission signal comprises a first transmission signal and a second transmission signal, and wherein the digital feedback signal comprises a forward signal received in response to provision of the first transmission signal, and a reverse signal received in response to provision of the second transmission signal.

15. The operating method of claim 13, wherein the sampling information comprises at least one of a sampling rate and a sampling count.

16. The operating method of claim 13, wherein the sampling information is controlled as first sampling information based on the resource block size exceeding a threshold value, and is controlled as second sampling information based on the resource block size being less than or equal to the threshold value.

17. The operating method of claim 13, further comprising: determining whether the electronic device is gripped based on the reflection coefficient.

18. The operating method of claim 17, wherein the determining whether the electronic device is gripped based on the reflection coefficient comprises displaying the reflection coefficient on a complex plane, and determining that the electronic device is gripped by a user based on the reflection coefficient being displayed outside a circle displayed on the complex plane, and wherein the circle has, as a center, a reflection coefficient determined based on the electronic device being not gripped.

19. The operating method of claim 18, wherein the circle has a different center depending on a frequency band, and has a different radius depending on the frequency band.

20. A non-transitory computer-readable storage medium storing a program that, when executed by at least one processor, causes the electronic device to perform the operating method of claim 13.

* * * * *